United States Patent [19]
Grieb

[11] 3,959,677
[45] May 25, 1976

[54] ELECTRIC MOTOR DEVICE AND HEAT SINK AND METHOD OF ASSEMBLING

[75] Inventor: Dale Christian Grieb, Baltimore, Md.

[73] Assignee: The Black and Decker Manufacturing Company, Towson, Md.

[22] Filed: Oct. 16, 1974

[21] Appl. No.: 515,366

Related U.S. Application Data

[62] Division of Ser. No. 391,530, Aug. 27, 1973.

[52] U.S. Cl. .................................. 310/90; 310/50; 310/62; 308/77
[51] Int. Cl.² .......................................... H02K 7/08
[58] Field of Search ................... 310/50, 47, 42, 43, 310/66, 90, 53, 62, 68, 63, 89, 64, 91; 165/105; 308/237, 76, 77, 22; 29/596

[56] References Cited
UNITED STATES PATENTS

| | | | |
|---|---|---|---|
| 3,252,020 | 5/1966 | Consoli | 308/77 |
| 3,546,502 | 12/1970 | Botefuhr | 308/77 |
| 3,699,825 | 10/1972 | Misuraca | 310/47 |
| 3,706,483 | 12/1972 | Irwin | 308/77 |
| 3,824,684 | 7/1974 | Wheeler | 310/50 |
| 3,831,048 | 8/1974 | Wagner | 310/90 |
| 3,873,862 | 3/1975 | Butler | 310/50 |

*Primary Examiner*—R. Skudy
*Attorney, Agent, or Firm*—Edward D. Murphy; Joseph R. Slotnik; Leonard Bloom

[57] ABSTRACT

An electric motor housing and heat sink, and the method of assembling the same, in which a housing, constructed of electrically insulating material subject to thermal distortion, includes integral means for orienting and securing a metal heat sink therein, the latter having passages through which cooling air is drawn. The orienting means comprises deformable or meltable means such as pins integral with the housing and adapted to extend through apertures in the heat sink. In addition, a shaft bearing may either be preassembled in the heat sink before assembly to the housing, or the heat sink bored and the bearing inserted therein after the heat sink is assembled to the housing.

5 Claims, 14 Drawing Figures

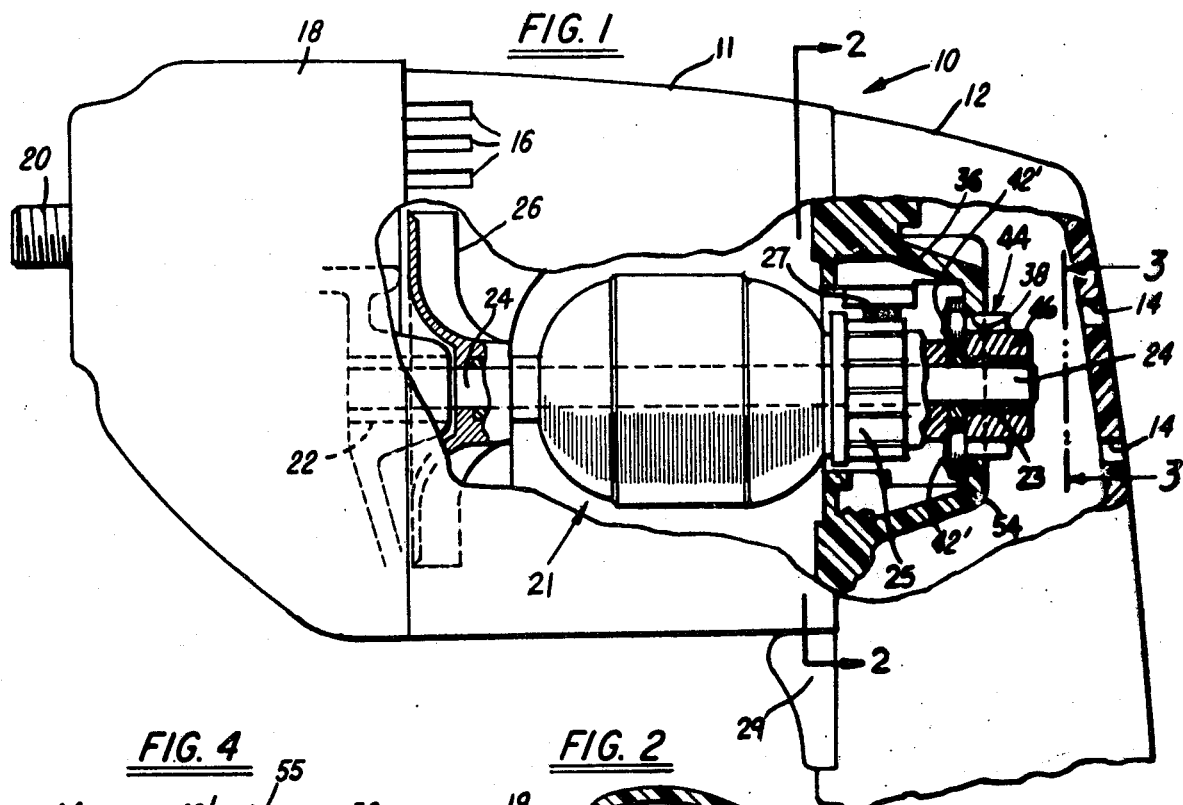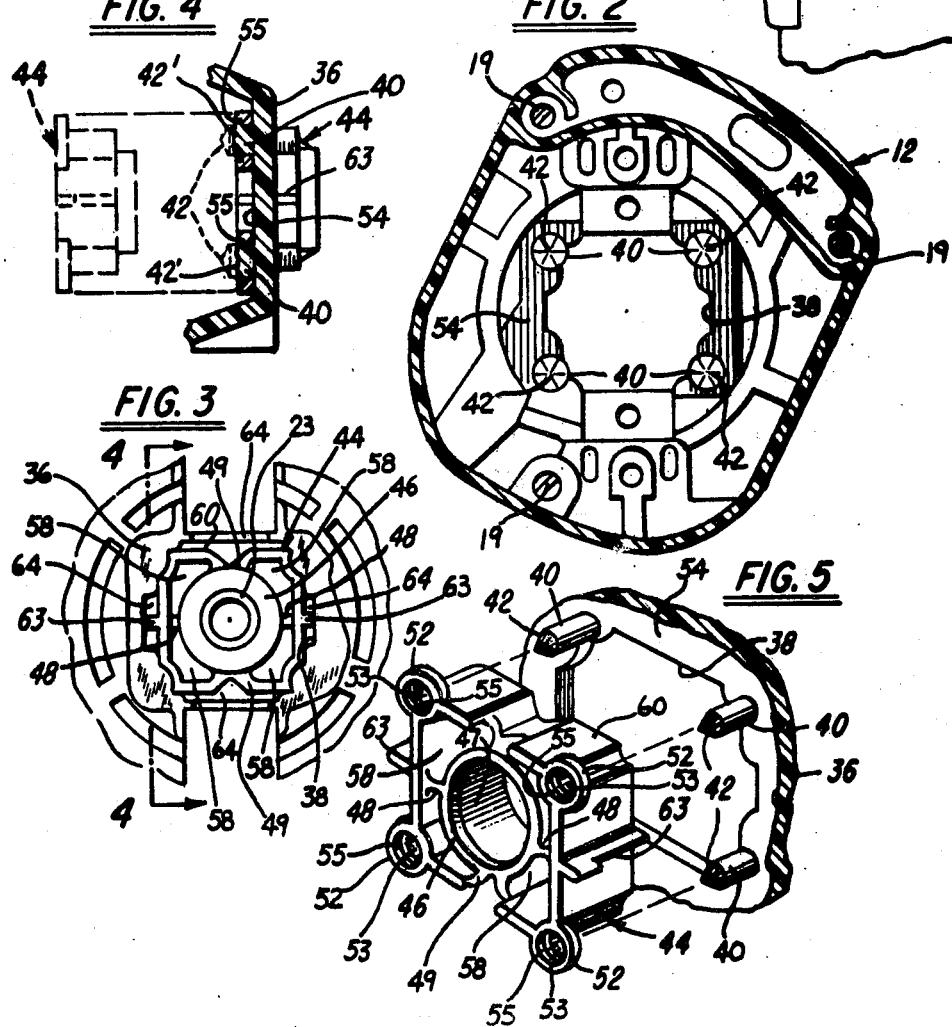

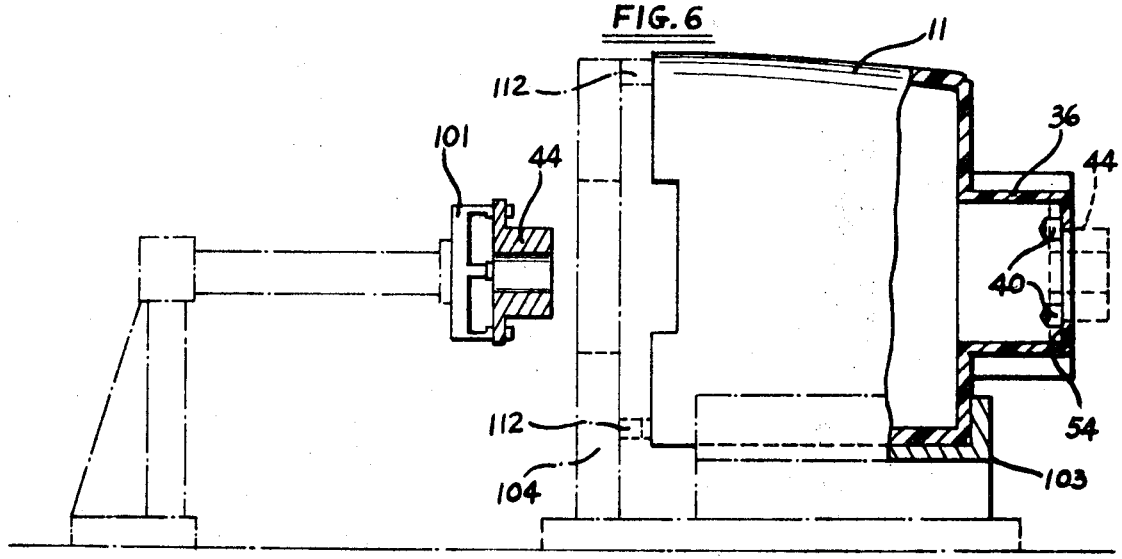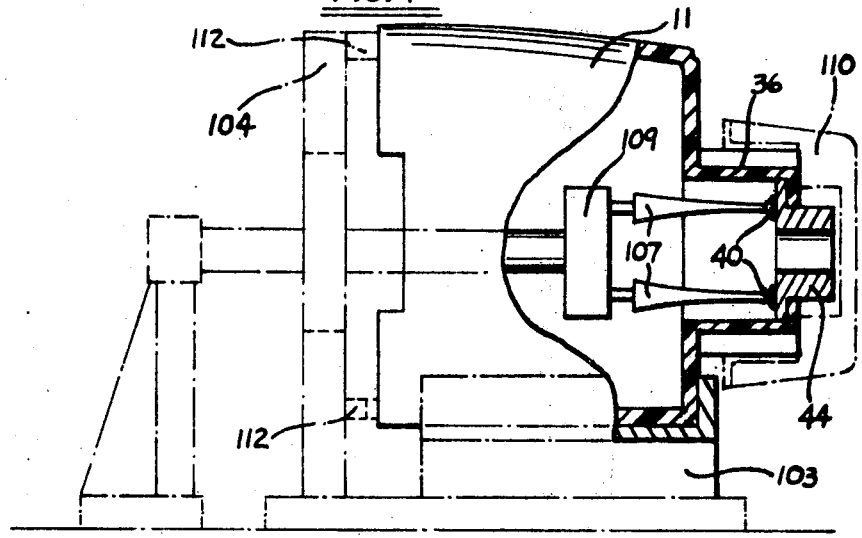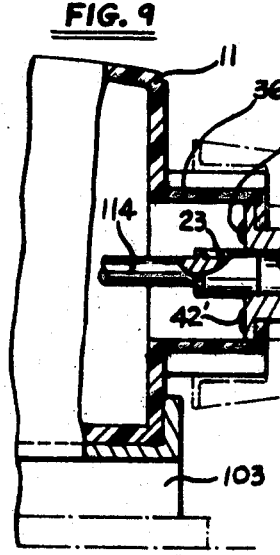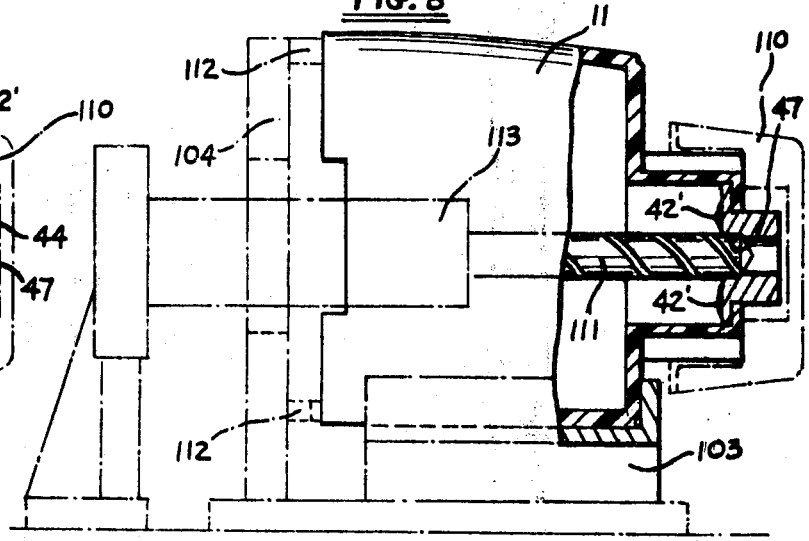

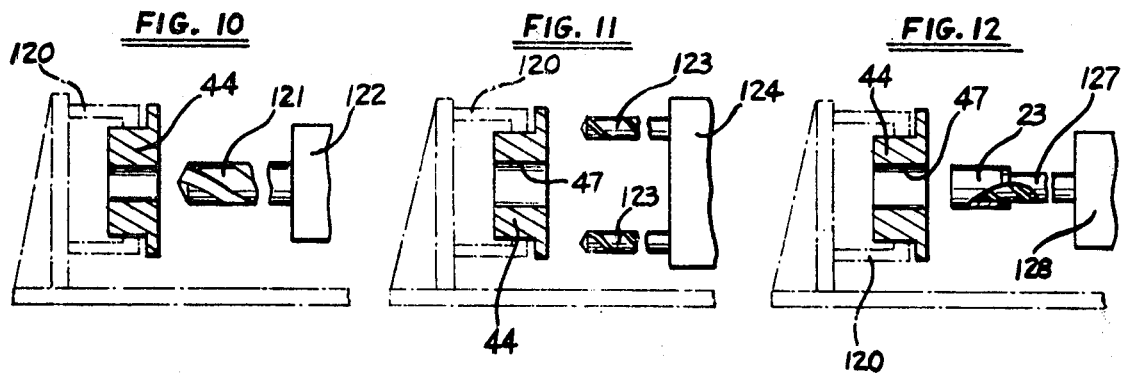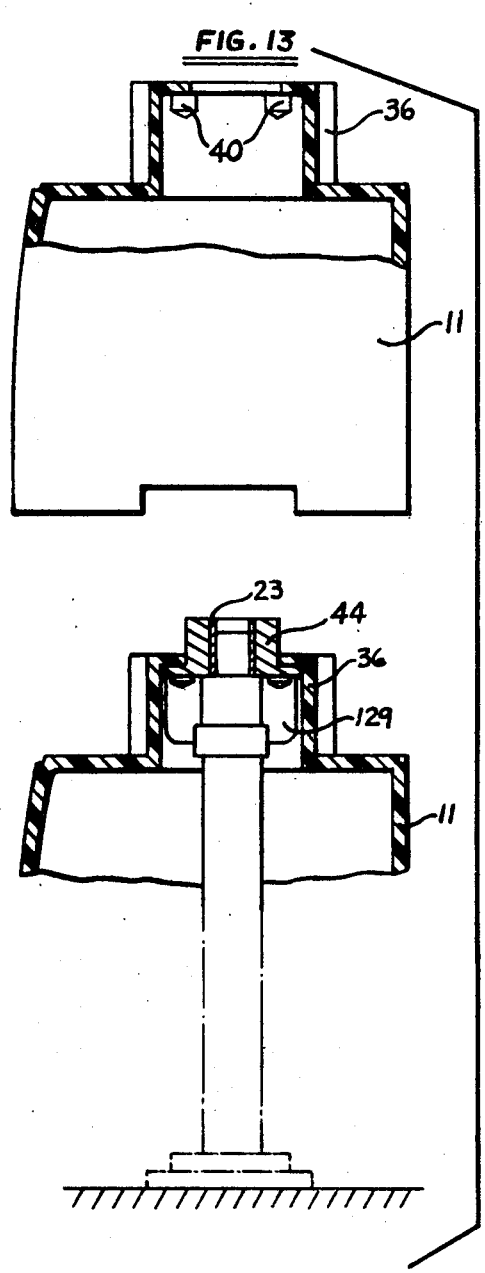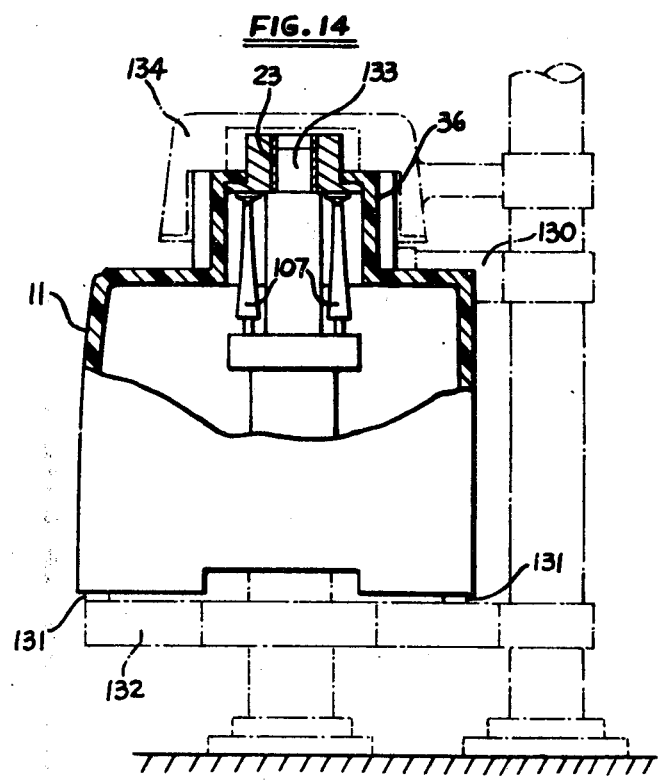

ELECTRIC MOTOR DEVICE AND HEAT SINK AND METHOD OF ASSEMBLING

RELATED APPLICATIONS

This application is a division of my co-pending application, Ser. No. 391,530 which is in turn related to the copending application of Dale K. Wheeler, Ser. No. 391,812, now U.S. Pat. No. 3,824,684, filed concurrently herewith and owned by the assignee of the present application.

BACKGROUND OF THE INVENTION

This invention relates generally to electric motor devices such as power tools, and more particularly to an insulating motor housing having a motor shaft support and heat sink secured therein. The invention includes the method of accurately and inexpensively assembling the heat sink to the housing and forming or locating a motor shaft bearing in the heat sink.

Portable electric devices such as power tools, often include electrically insulating motor housings for good electrical insulation. Of these, a number employ thermoplastic materials because of the versatility, impact resistance, and attractive appearance of those materials. These electrically insulating materials, however, are also poor heat conductors, and care must be taken to ensure good heat dissipation. Otherwise, heat build up during use of the device can shorten the life of the moving parts. Also, excessive heat accumulation can soften and possibly distort the thermoplastic housing material, and this is a particularly undesirable condition especially where the thermoplastic material is a structural part of the device, e.g., a structural support for one of the motor shaft bearings.

SUMMARY OF THE INVENTION

Primary objects of the invention are to provide a novel method of assembling an insulating housing and metal heat sink for an electric motor device, which method is inexpensively performed and results in an accurate, efficient, and reliable device; and further to provide an improved assembled thermoplastic electric motor housing and motor shaft supporting heat sink which ensures adequate cooling at critical areas and prevents thermal distortion of the housing.

More specifically, the method includes orienting and assembling a heat sink in a thermoplastic housing by interengaging means on the housing and heat sink, and deforming means integral with the housing into retaining engagement with the heat sink. In a preferred embodiment, projections integral with the housing fit through apertures in the heat sink and are deformed by, for example, application of heat or ultrasonic excitation, into retaining engagement with the heat sink. The heat sink itself can be shaped to form a bearing for the motor shaft, or a separate bearing can be positioned on a machined heat sink surface accurately aligned with the motor housing. This step of forming a bearing on or assembling a bearing to the heat sink can be performed before or after the steps of assembling the heat sink to the motor housing.

These together with other and more specific objects and advantages will become apparent from the following description of exemplary embodiments when taken with the drawing forming a part thereof, and in which:

BRIEF DESCRIPTION OF THE DRAWING

FIG. 1 is a side elevational view, portions broken away and sectioned for purposes of clarity, showing an electric tool in which the invention is incorporated;

FIG. 2 is an enlarged sectional view taken on the plane of line 2—2 of FIG. 1 and shown with the heat sink removed;

FIG. 3 is an enlarged sectional view taken on the plane of line 3—3 of FIG. 1;

FIG. 4 is a section taken on the plane of line 4—4 of FIG. 3;

FIG. 5 is a fragmentary exploded perspective view showing a heat sink element and the orienting pins integral with the tool housing prior to integration.

FIG. 6 is a schematic view showing the step of assembly of the heat sink and motor housing in accordance with the present invention;

FIG. 7 is a schematic view representing the step of securing the heat sink and motor housing shown as carried out by an ultrasonic welding device;

FIG. 8 is a schematic showing of the step of machining a bearing bore in the heat sink;

FIG. 9 is a schematic showing of a bearing being assembled in the machined bearing bore in the heat sink;

FIG. 10 is a schematic view showing, in another form of the invention, a bearing bore being machined in a rough cast heat sink;

FIG. 11 is a schematic view showing the mounting openings for the heat sink being machined therein;

FIG. 12 is a schematic view showing the step of assembling a bearing in the machined bore in the heat sink of FIGS. 10 and 11;

FIG. 13 is a schematic view showing the step of locating a thermoplastic motor housing on the machined and subassembled heat sink and bearing of FIGS. 10-12; and FIG. 14 is a schematic view showing the step of integrally joining the assembled heat sink and thermoplastic motor housing of FIG. 13.

DESCRIPTION OF PREFERRED EMBODIMENTS

Referring to the drawing and first considering FIGS. 1-5, an exemplary portable electric power tool 10 in which the present invention finds particular use, comprises a molded thermoplastic motor housing 11 having a handle 12 and a gear case 18 secured thereto by screws 19. An electric motor 21 is enclosed within the motor housing 11 and includes an armature shaft 24 supported fore and aft by bearings 22, 23 carried by the gear case 18 and a bridge 36 integral with the motor housing 11, respectively. A fan 26 is rigid with the armature shaft 24 and, during operation of the motor 21, serves to draw cooling air inwardly through openings 14 formed in the handle 12, past the bearing 23, over and through the motor 21. This cooling air is then discharged radially through openings 16 in the motor housing 11. The motor 21 also includes a commutator 25, brushes 27, and a trigger switch 29 for suitable control and operation thereof.

In the construction shown, the gear case 18 is constructed of metal, and therefore adequately serves to dissipate heat arising at the bearing 22 during operation of the tool. On the other hand, the bridge 36 supporting the rear bearing 23 is integral with and constructed of the same electrically and thermally insulating material, e.g., thermoplastic material, as the motor housing 11.

Since thermoplastics are inherently poor heat conductors, care must be taken to adequately dissipate heat arising at the rear bearing 23 during operation of the device. This is important since heat build up at the bearing 23 can damage and shorten its operating life. Furthermore, this heat, if not dissipated, can soften and distort the bridge 36 and misalign the bearing 23, thereby further shortening its life and possibly damaging other motor parts.

To this end, a heat sink 44 is fixedly supported upon the bridge 36 and carries the bearing 23. The heat sink 44 is constructed of a good thermally conductive material, such as cast aluminum or magnesium, and includes a generally rectangular frame 60 having a central sleeve 46 spacedly supported therein by ribs 48, 49. The frame 60, sleeve 46, and ribs 48, 49 form air passages 58 by means of which the cooling air drawn inwardly through openings 14 is allowed to pass.

As shown, the heat sink 44 extends through an opening 38 formed in the bridge 36, and is transversely supported and axially positioned therein by stepped external ribs 63 formed on the heat sink. When so assembled, the heat sink 44 and bridge 36 form additional air passages 64 also through which cooling air drawn inwardly through the openings 14 can pass. Thus, sufficient air flow occurs through and over the heat sink 44 during operation of motor 21 to ensure cool operating temperatures of the bearing 23 and to prevent softening of the thermoplastic material in the bridge 36.

In accordance with the present invention, the heat sink 44 is assembled to the housing 11, specifically, to the housing bridge 36, in a novel manner and which results in an improved assembled construction calculated to achieve a reliable and long life arrangement, and one which embodies low cost and assembly. As shown, the heat sink frame 60 has a plurality (four) of apertured ears 52 extending outwardly, one at each corner thereof. Each of the ears 52 has a central bore 53 adapted to slidably receive a respective pin or projection 40 formed integral with the bridge 36, and is counterbored a 55. The pins 40, when slidably fitted into the apertures 53 in ears 52, guide the heat sink 44 into position within the opening 38 formed in the bridge 36. If desired, the pins 40 can be slightly smaller in diameter than the apertures 53 so to allow a limited amount of play and final alignment of the bearing support and heat sink 44 when assembled thereto. In addition, the pins 40 can be formed with conical ends 42 to assist in assembly of the heat sink 44 thereto.

After the heat sink 44 is so positioned on pins 40, and with the stepped ribs 63 in position in the bridge opening 36, that portion of the pins 40 extending beyond the apertured ears 52 is deformed to swage the pin ends over as shown at 42' in FIGS. 1 and 4. This "swaging over" of the pin ends can be achieved, for example, by application of heat to or ultrasonic excitation of the pins 40 causing the thermoplastic material thereof to melt. When this occurs, the swaged material 42' fills the counterbores 55 in the ears 52 and securely retains the heat sink 44 in place in the housing 11.

Turning now specifically to the inventive method, in one form of this method, schematically represented by FIGS. 6–9, a cast heat sink 44 held by fixture 101 shown in FIG. 6, is placed in the bridge 36 of molded thermoplastic housing 11, held by fixtures 103, 104, by moving fixture 101 relative to fixtures 103, 104, the "placed" heat sink being shown in dotted lines in FIG. 6. This positions the thermoplastic pins 40 through the bores 53 in the ears 52, and the ears 52 against a bottom surface 54 of the bridge, while the heat sink frame 60 is located in the bridge aperture 38 by the stepped ribs 63. The assembled motor housing 11 and heat sink 44 then move to the next position (FIG. 7) where an ultrasonic horn 107 carried by a fixture 109 engages and excites the protruding ends of the pins 40, causing the material thereof to be ultrasonically melted or swaged over as shown at 42', substantially filling the ear counterbores 55 and securely retaining the heat sink 44 in place in the housing 11. During this step, the bridge 36 is backed up by a support 110.

The assembled housing 11 and heat sink 44, with the support 110 still engaging bridge 36, then moves to one or more stations where the heat sink 44 has a machined bearing bore 47 formed therein. This step or steps are illustrated in FIG. 8 wherein a tool 111 carried by a fixture 113 is operating on the heat sink 44, the latter being stabilized by support 110 still engaging bridge 36. Accurate positioning of the tool 111 relative to the motor housing 11 is ensured by locating means 112 on fixture 104 engaging lands on the motor housing 11 so that machined bore 47 is accurately positioned with respect to other motor parts to be located in the motor housing 11. Tool 111 and the schematic illustration of FIG. 8 is intended to represent, for example, a boring and remaining process which ultimately forms an accurately machined bearing bore 47.

Following this, the assembly moves to a station (FIG. 9), where the bearing 23 is pressed into the machined bore 47 using a tool 114. Again, support 110 remains engaged with bridge 36 to stabilize the parts during this step.

In another form of the invention, schematically represented in FIGS. 10–14, rough cast heat sinks 44 are positioned in a fixture 120 and have bearing bores 47 accurately machined therein by, for example, boring and reaming tools illustrated schematically at 121 (FIG. 10) and carried by a fixture 122. The heat sink ears 52 are bored and counterbored, as illustrated previously at 53, 55, in accurate relation to the bearing bore 47 using boring tools 123 carried by fixture 124 (FIG. 11). Following this, bearing 23 is pressed into bore 47 of heat sink 44 still held by fixture 120 using a tool 127 and a fixture 128.

Upon completion of subassembly of the accurately machined heat sink 44 and bearing 23, these units are set upon a fixture 129 and the molded thermoplastic housings 11 placed thereover to locate the pins 42 through the ear apertures 53 (FIG. 13). Thereafter, with the motor housing 11 clamped by a fixture 130, and accurately located with respect to the bearing 23 by locating means 131 carried by a fixture 132 and engaging land surfaces in housing 11, and a pilot tool 133 located in the bearing 23, and with a support 134 engaging and stabilizing the bridge 36, the pins 42 are deformed, again, for example, using ultrasonic horns 107, to secure the heat sink 44 in place in the motor housing 11 (FIG. 14). In this method, final radial positioning of the heat sink 44 and the bearing 23 is accurately maintained by the locating parts 131, 133, and the softened thermoplastic material of the pins 42 and of the bridge 36 during this process accommodates some slight final radial adjustment of the heat sink 44 and bearing 23 relative to the motor housing 11. Furthermore, the softened material of bridge 36 will allow some embedding of heat sink 44 therein, and this, together with tool 133 engaging bearing 23, ensures proper final axial positioning of bearing 23 in motor housing 11.

Briefly, in review, there has been disclosed novel methods comprising steps for locating an improved heat sink in a thermoplastic electric motor housing; these methods incorporate utilizing the inherent formability or meltability of the relatively inexpensive thermoplastic housing to assemble and accurately position the parts. In addition, these methods and the resulting improved construction eliminates the use of press fits and or separate adhesives or mechanical fasteners and the time and costs involved through their installation. Further, the use of deformed or melted thermoplastic material holding the heat sink in place eliminates the danger of loose mechanical fasteners during use of the tool and the dangers of shorting out the electrical circuits and damage to moving parts, etc.

Likewise, in relation to the novel combination as disclosed, the improved bearing heat sink is integrally mounted in a thermoplastic electric motor housing, and this heat sink not only provides a bearing support (or bearing), but includes means for cooling the bearing increasing its life-use and more readily permits usage of thermoplastic moldings without subjecting them to distorting heat attendant with electric motor shafts.

Furthermore, it will be appreciated that the foregoing description makes reference to the heat sink 44 incorporating a separate bearing 23. It will be appreciated, however, that the heat sink 44 could be constructed of a suitable material, such as powdered metal, so that the bored collar 46 can form the rear bearing for shaft 24.

By the foregoing, there has been disclosed a novel electric motor device and heat sink and method of assembly calculated to fulfill the inventive objects set forth herein, while preferred embodiments of this invention have been described herein, various additions, modifications, substitutions, and omissions may be made thereto without departing from the spirit of the invention.

I claim:

1. In an electric motor device of the type comprising a housing of a thermoplastic material having air inlet and outlet portions; a shaft in said housing; axially aligned bearing means in said housing journalling said shaft; fan means mounted on said shaft for moving air through said housing between said inlet and outlet portions for cooling the interior of said housing; the improvement in which at least one of said bearing means includes an apertured metal bearing heat sink, said heat sink having a first set of apertures for the passage of cooling air, said heat sink also having a second set of apertures; and pin means integral with said housing extending through said second set of apertures for mounting said heat sink in a fixed location, said pin means including an enlarged portion thereof in engagement with the surface of said heat sink about said second set of apertures.

2. The structure as claimed in claim 1 in which said heat sink includes a bearing in which one end of the shaft is journaled.

3. The structure as claimed in claim 1 in which said bearing heat sink includes a central bearing sleeve integral with outwardly projecting relatively thin heat conducting webs and defining passages therebetween which extend in the direction of said sleeve whereby ambient air moves axially past said sleeve.

4. The structure as claimed in claim 1 including a collar integral with and surrounding said sleeve; said housing including an apertured web into which said collar is telescoped.

5. The structure as claimed in claim 4 including apertured ear portions at one end of said collar, said housing having an integral web including said pin means having integral thermoplastic orienting pins projecting through said apertured ear portions, said pins being melted in overlying relation onto said ear portions and integrating said heat sink element with the web as a permanently mounted unit thereon.

* * * * *